United States Patent
Haraguchi

(10) Patent No.: US 10,012,973 B2
(45) Date of Patent: Jul. 3, 2018

(54) NUMERICAL CONTROLLER

(71) Applicant: FANUC CORPORATION, Minamitsuru-gun, Yamanashi (JP)

(72) Inventor: Takahiro Haraguchi, Yamanashi (JP)

(73) Assignee: FANUC CORPORATION, Yamanishi (JP)

(*) Notice: Subject to any disclaimer, the term of this patent is extended or adjusted under 35 U.S.C. 154(b) by 105 days.

(21) Appl. No.: 15/355,212

(22) Filed: Nov. 18, 2016

(65) Prior Publication Data

US 2017/0146972 A1    May 25, 2017

(30) Foreign Application Priority Data

Nov. 19, 2015  (JP) .................................. 2015-226434

(51) Int. Cl.
    G05B 19/19    (2006.01)

(52) U.S. Cl.
    CPC .... *G05B 19/19* (2013.01); *G05B 2219/42249* (2013.01)

(58) Field of Classification Search
    None
    See application file for complete search history.

(56) References Cited

U.S. PATENT DOCUMENTS

| 4,692,856 A | 9/1987 | Komiya |
| 2003/0191553 A1 | 10/2003 | Isohata |
| 2015/0177728 A1 | 6/2015 | Haraguchi et al. |

FOREIGN PATENT DOCUMENTS

| JP | 59-177604 | 8/1984 |
| JP | 2003-303005 A | 10/2003 |
| JP | 2007-304714 A | 11/2007 |
| JP | 2015121966 A | 7/2015 |

OTHER PUBLICATIONS

Notification of Reasons for Refusal for Japanese Application No. 2015-226434, dated Nov. 28, 2017, including English translation, 4 pages.

*Primary Examiner* — Carlos Ortiz Rodriguez
(74) *Attorney, Agent, or Firm* — RatnerPrestia

(57) ABSTRACT

A numerical controller of the invention includes an overlap control unit that detects a reference value minimizing a synthesized velocity for a plurality of control axes calculated based on table format data in an overlap period in which the synthesized velocity is equal to or lower than a threshold set in advance, that finds an overlap quantity as an amount in the reference value of overlapping of travels of the control axes after the detected reference value with travels of the control axes before the detected reference value, that advances the travels of the control axes after the reference value minimizing the synthesized velocity by the overlap quantity, and that calculates post-correction travels resulting from superposition of the travels of the control axes after the reference value on the travels of the control axes before the reference value minimizing the synthesized velocity.

12 Claims, 15 Drawing Sheets

NUMERICAL CONTROLLER ACCORDING TO PRIOR ART TECHNIQUE

NUMERICAL CONTROLLER ACCORDING TO ONE EMBODIMENT OF THE INVENTION

FIG. 3

| REFERENCE VALUE (msec) | X TRAVEL (mm) | Z TRAVEL (mm) | SYNTHESIZED VELOCITY (mm/msec) | REMARK |
|---|---|---|---|---|
| 1995 | 0.016 | 0.000 | 0.016 | |
| 1996 | 0.008 | 0.000 | 0.008 | FALL BELOW THRESHOLD $V_t$ → START OF OVERLAP PERIOD |
| 1997 | 0.004 | 0.000 | 0.004 | |
| 1998 | 0.002 | 0.000 | 0.002 | |
| 1999 | 0.001 | 0.000 | 0.001 | STORE $L_0$ = 1999 BRINGING ABOUT LOWER LIMIT VELOCITY $V_0$ = 0.001 |
| 2000 | 0.000 | 0.001 | 0.001 | STORE $L_0$ = 2000 BRINGING ABOUT LOWER LIMIT VELOCITY $V_0$ = 0.001 |
| 2001 | 0.000 | 0.002 | 0.002 | |
| 2002 | 0.000 | 0.004 | 0.004 | |
| 2003 | 0.000 | 0.008 | 0.008 | |
| 2004 | 0.000 | 0.016 | 0.016 | EXCEED THRESHOLD $V_t$ → END OF OVERLAP PERIOD |

| REFERENCE VALUE (msec) | X TRAVEL (mm) | Z TRAVEL (mm) | SYNTHESIZED VELOCITY (mm/msec) | REMARK |
|---|---|---|---|---|
| 1995 | 0.016 | 0.000 | 0.016000 | |
| 1996 | 0.008+0.000 | 0.000+0.001 | 0.008062 | OVERLAP OF L = 2000 OF PRE-CORRECTION TRAVEL |
| 1997 | 0.004+0.000 | 0.000+0.002 | 0.004472 | OVERLAP OF L = 2001 OF PRE-CORRECTION TRAVEL |
| 1998 | 0.002+0.000 | 0.000+0.004 | 0.004472 | OVERLAP OF L = 2002 OF PRE-CORRECTION TRAVEL |
| 1999 | 0.001+0.000 | 0.000+0.008 | 0.008062 | OVERLAP OF L = 2003 OF PRE-CORRECTION TRAVEL |
| 2000 | 0.000 | 0.016 | 0.016000 | ADVANCE LATER TRAVEL OUTPUT FOR ALL AXES BY 4 msec |

TOOL PATH CONTROLLED
BY X AND Z AXES

NUMERICAL CONTROLLER

BACKGROUND OF THE INVENTION

1. Field of the Invention

The present invention relates to a numerical controller and particularly relates to a numerical controller that carries out overlapping in operation based on table format data.

2. Description of the Related Art

As a method of controlling drive of each control axis individually in synchronization with motion of a reference axis, an operation function based on table format data is well known in which position information on the control axes is stored in association with a reference axis position in the table format data provided in a memory or the like and in which each control axis is operated in synchronization with the reference axis based on the information stored in the table format data. In the function, the table format data in which time, axis positions, or axis positions based on spindle position, or auxiliary functions such as M code are set is stored in the memory or a storage device connected with a network, and the axes and the auxiliary functions are controlled while the table format data is read sequentially.

Japanese Patent Application Laid-Open No. 59-177604 and Japanese Patent Application Laid-Open No. 2003-303005 disclose numerical controllers that exercise so-called path table operation function or electronic cam control utilizing the operation function based on the table format data. These techniques enable free tool operations not restricted by machining programs and thereby attain shortening of machining time, increase in machining accuracy, and the like.

In the prior art operation based on the table format data, reference values described in the table format data and coordinate values, corresponding to the reference values, of an axis or a spindle are set as control points and a travel is calculated based on two control points set as a start point and an end point. Specifically, from the reference value and the coordinate value of the axis or the spindle at the control point that is the start point and the reference value and the coordinate value of the axis or the spindle at the control point that is the end point, a difference between the reference values of the two points and a difference between the coordinate values of the axis or the spindle at the two points are calculated and the travel per unit reference value is calculated from the differences.

FIG. 11 illustrates an example of prior art axis control using the table format data. The table format data <TIME_TABLE_0101_X> is table format data for control over an X axis based on time. L denotes the reference value (reference time: in msec) and X denotes the coordinate value (in mm) of the X axis that corresponds to the reference value. With the current reference value set as 1000 msec, the X axis moves between the two control points that are the start point with the reference value of 1000 msec and the coordinate value of 100.0 mm and the end point with the reference value of 2000 msec and the coordinate value of 200.0 mm.

FIG. 12 illustrates a schematic block diagram on a numerical controller for calculation of the travel. The numerical controller 1 illustrated in FIG. 12 notifies a distribution processing unit 11x of command blocks, sequentially read out by a readout unit, as the two control points, that is, the start point and the end point, finds the travel per unit reference value from the differences in the reference value and the coordinate value between the two control points by the distribution processing unit 11x, and notifies a motor control unit of the travel. In FIG. 12, illustration of the readout unit for the command blocks and the motor control unit is omitted.

In the distribution processing unit 11x, in the example of the X axis control using the table format data <TIME_TABLE_0101_X> having the start point with the reference value of 1000 msec and the coordinate value of 100.0 mm and the end point with the reference value of 2000 msec and the coordinate value of 200.0 mm, the travel per unit reference value is calculated at 0.1 mm/1 msec from the difference in the reference value of 1000 msec (2000 msec-1000 msec) and the difference in the coordinate value of 100.0 mm (200.0 mm-100.0 mm).

In practice, however, it is necessary to insert acceleration/deceleration commands after and/or before start/end of an operation of the axis in order to relax impact that is caused by acute velocity change. Japanese Patent Application Laid-Open No. 2007-304714 discloses a technique of controlling acceleration/deceleration by connection through quadratic/cubic function in operation based on table format data. With application of the technique of Japanese Patent Application Laid-Open No. 2007-304714, the axis control is carried out based on the table format data illustrated in FIG. 13. Description on the commands in acceleration/deceleration sections on occasions of the start/end of the operation of the axis will be omitted below for simplification.

FIG. 13 is an example of the axis control using the table format data for only the X axis. In general, however, movement of tool holders, a work mounting table, and the like is controlled by independent operation of a plurality of axes in synchronization with the reference value.

FIG. 14 illustrates an example in which a tool is controlled with use of table format data for the X axis and a Z axis. In the operation based on table format data, each axis is independently operated in synchronization with the reference value. FIG. 15 illustrates a schematic block diagram on a numerical controller that controls a tool with use of the table format data <TIME_TABLE_0101_X> and <TIME_TABLE_0101_Z> illustrated in FIG. 14. In FIG. 15, distribution processing with the current reference value being between L1000 and L2000 is illustrated.

In consideration of shortening of cycle time of the operation based on the table format data illustrated as the prior art technique in FIG. 14, in corner parts such as L2000 where a synthesized velocity falls, it is necessary to make commands before and after the corners overlap by advancing start timing for the commands just after the corner parts. FIG. 16 illustrates an overlapping operation of the X axis and the Z axis between L1900 and L2000 in the operation based on the table format data illustrated in FIG. 14. By the overlapping of the X axis and the Z axis, as illustrated in FIG. 16, the cycle time is shortened by 100 ms subjected to the overlapping.

In the operation based on the table format data, however, a direction of travel, the synthesized velocity, and/or the like of a tool can only be calculated when a plurality of table format data are analyzed in parallel and thus it has been difficult for an operator to manually search for sites permitting the overlapping or to manually adjust overlap quantity by analyzing the table format data outputted from CAM. In performance of such a task, accordingly, it has been necessary to prepare CAM supporting the overlapping of the table format data and to output afresh the table format data from the CAM each time the overlapping sites, the overlap quantity, or the like is changed and working therefor has cost the operator labor.

SUMMARY OF THE INVENTION

An object of the invention is to provide a numerical controller that includes means capable of performing detection and correction of overlapping sites in operation based on table format data.

A numerical controller according to the invention to set time, an axis position, or a spindle position as a reference value, to use a plurality of table format data specifying positions of control axes, and to control the positions of the plurality of control axes in synchronization with the reference value includes readout units that sequentially read out the table format data in synchronization with the reference value, distribution processing units that generate travels of the control axes based on command blocks read out by the readout units, a travel holding unit that temporarily stores the travels of the control axes generated by the distribution processing units, and an overlap control unit that reads out the travels of the control axes from the travel holding unit, that finds an overlap quantity as an amount in the reference value of overlapping of the travels of the control axes, and that writes post-correction travels resulting from the overlapping of the travels of the control axes by the overlap quantity into the travel holding unit, and the numerical controller is characterized in that the control axes are controlled based on the post-correction travels.

The overlap control unit is characterized in that the overlap control unit reads out the travels of the plurality of control axes in synchronization with the reference value and thereby calculates a synthesized velocity.

The overlap control unit is characterized in that the overlap control unit detects the reference value minimizing the synthesized velocity in an overlap period in which the synthesized velocity is equal to or lower than a threshold specified in advance, finds the overlap quantity as the amount in the reference value of the overlapping of the travels of the control axes after the detected reference value with the travels of the control axes before the detected reference value, advances the travels of the control axes after the reference value minimizing the synthesized velocity by the overlap quantity, and calculates the post-correction travels resulting from superposition of the travels of the control axes after the reference value on the travels of the control axes before the reference value minimizing the synthesized velocity.

The overlap control unit is characterized in that the overlap control unit finds the overlap quantity within a range in which the post-correction travels are equal to or lower than the threshold in the overlap period.

The overlap control unit is characterized in that the overlap control unit is capable of changing the threshold by commands based on the table format data, parameters, or signals.

A numerical controller according to the invention to set time, an axis position, or a spindle position as a reference values, to use a plurality of table format data specifying positions of control axes, and to control the positions of the plurality of control axes in synchronization with the reference value includes readout units that sequentially read out the table format data in synchronization with the reference value, distribution processing units that generate travels of the control axes based on command blocks read out by the readout units, a travel holding unit that temporarily stores the travels of the control axes generated by the distribution processing units, an overlap control unit that reads out the travels of the control axes from the travel holding unit, that finds an overlap quantity as an amount in the reference value of overlapping of the travels of the control axes, and that outputs post-correction table format data in which overlap commands to carry out the overlapping by the overlap quantity are added to the table format data, post-correction readout units that sequentially read out the post-correction table format data in synchronization with the reference value, and post-correction distribution processing units that generate post-correction travels of the control axes based on command blocks read out by the post-correction readout units, and the numerical controller is characterized in that the control axes are controlled based on the post-correction travels generated by the post-correction distribution processing units.

The overlap control unit is characterized in that the overlap control unit reads out the travels of the plurality of control axes in synchronization with the reference value and thereby calculates the synthesized velocity.

The overlap control unit characterized in that the overlap control unit detects the reference value minimizing the synthesized velocity in the overlap period in which the synthesized velocity is equal to or lower than the threshold specified in advance, finds the overlap quantity as the amount in the reference value of the overlapping of the travels of the control axes after the detected reference value with the travels of the control axes before the detected reference value, and outputs the post-correction table format data in which the overlap commands are added to the reference value minimizing the synthesized velocity.

The overlap control unit is characterized in that the overlap control unit finds the overlap quantity within a range in which the post-correction travels are equal to or lower than the threshold.

The overlap control unit is characterized in that the overlap control unit is capable of changing the threshold by commands based on the table format data, parameters, or signals.

The post-correction readout units are characterized in that, upon input of the overlap commands, the post-correction readout units simultaneously read out table format data commands before the overlap commands and table format data commands after the overlap commands and output the table format data commands to the post-correction distribution processing units.

The post-correction distribution processing units are characterized in that the post-correction distribution processing units calculate the post-correction travels resulting from superposition of pre-overlapping travels that are travels of the control axes calculated from the table format data commands before the overlap commands on post-overlapping travels that are travels of the control axes calculated from the table format data commands after the overlap commands.

The invention facilitates shortening of cycle time in the operation based on the table format data and thus has an effect of improving production efficiency.

BRIEF DESCRIPTION OF THE DRAWINGS

The above-mentioned and other objects and features of the invention will become apparent from the following description of the embodiments with reference to the accompanying drawings, in which:

FIG. 3 is a diagram illustrating changes in velocities of axes and a change in the synthesized velocity around an overlap period;

DETAILED DESCRIPTION OF THE PREFERRED EMBODIMENTS

Hereinbelow, embodiments of the invention will be described in conjunction with the drawings.

Figure 1A:
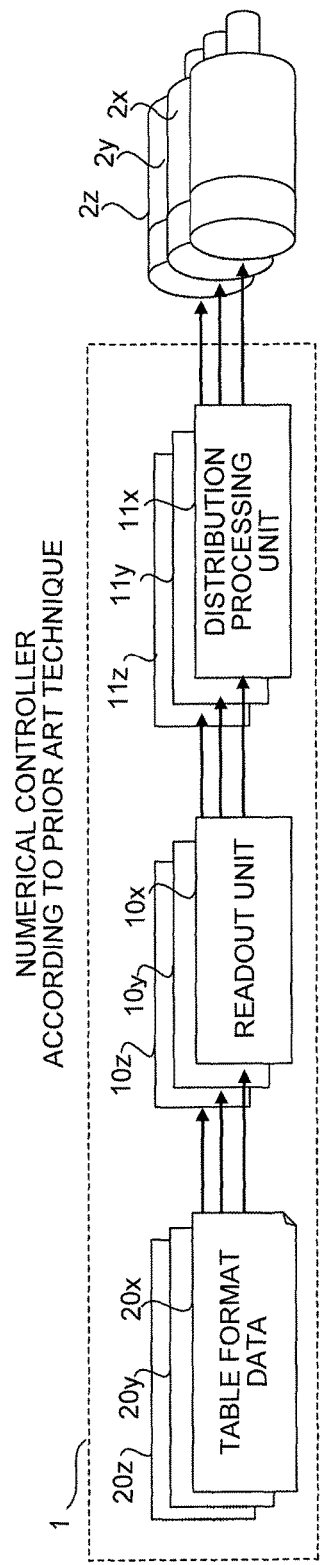
FIG. 1A is a block diagram illustrating a configuration of a numerical controller according to a prior art technique.
Figure 1B:
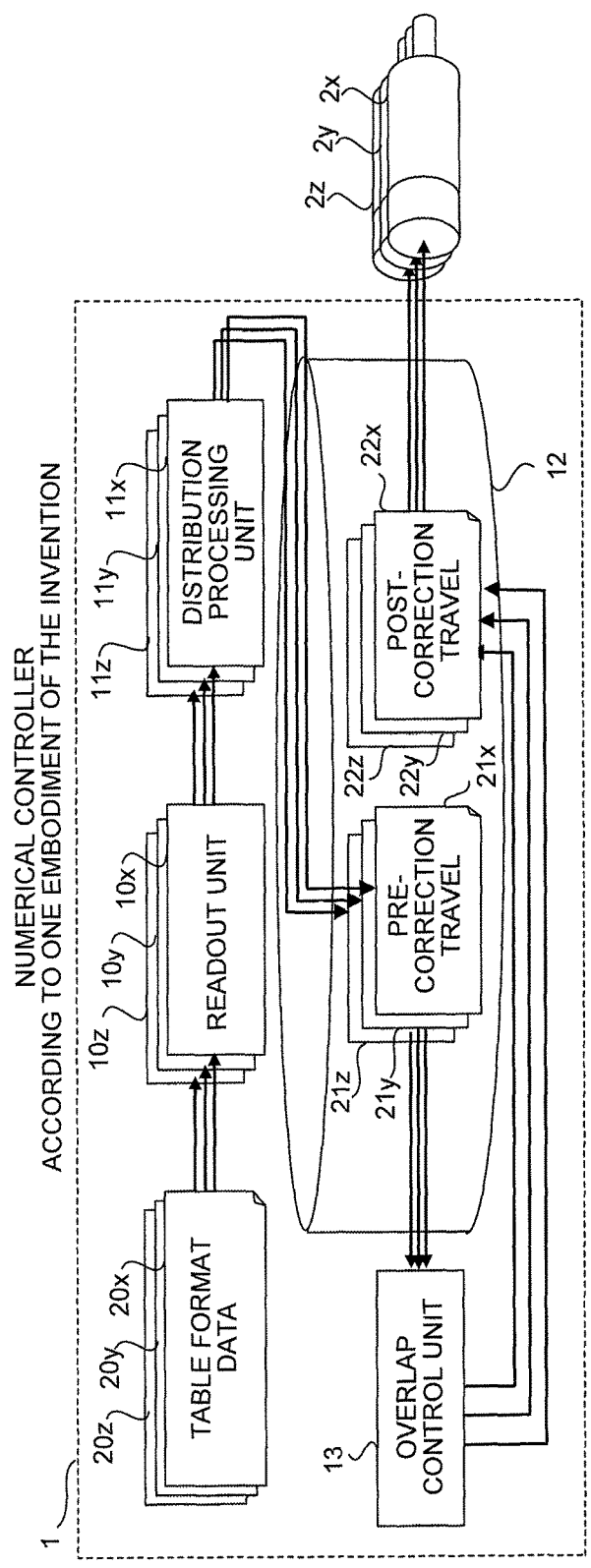
FIG. 1B is a block diagram illustrating a configuration of a numerical controller according to an embodiment of the invention.

In FIGS. 1A and 1B, FIG. 8, FIG. 10, FIG. 12, FIG. 15, components provided with reference characters including axis names are prepared corresponding to a number of axes to be controlled. For instance, FIGS. 1A and 1B illustrate examples in which the components thereof are respectively prepared for three axes, that is, X, Y, and Z axes.

FIG. 1A illustrates a block diagram on a numerical controller according to a prior art technique and FIG. 1B illustrates a block diagram on a numerical controller according to an embodiment of the invention.

In operation based on table format data with use of the numerical controller 1 of the prior art technique illustrated in FIG. 1A, readout units 10x through 10z respectively and sequentially read out command blocks for the axes from the table format data 20x through 20z prepared respectively for the axes and notify distribution processing units 11x through 11z prepared respectively for the axes of the command blocks read out, as two control points, that is, a start point and an end point. The distribution processing units 11x through 11z analyze reference values and coordinate values between the two notified control points and thereby calculate travels per unit reference value for motors 2x through 2z. The calculated travels per unit reference value are outputted to the motors 2x through 2z.

In the numerical controller 1 illustrated in FIG. 1B according to the embodiment of the invention, by contrast, a travel holding unit 12 and an overlap control unit 13 are newly provided. The overlap control unit 13 carries out calculation of synthesized velocities, detection of sites permitting overlapping, and calculation of travels for the motors after the overlapping and outputs the corrected travels to the motors 2x through 2z.

Hereinbelow, processing in the overlap control unit 13 will be described.

In the numerical controller 1 according to the embodiment, the readout units 10x through 10z respectively and sequentially read out command blocks from the table format data 20x through 20z for the axes and notify the distribution processing units 11x through 11z of the command blocks read out, as two control points, that is, a start point and an end point. The distribution processing units 11x through 11z calculate travels per unit reference value from differences in the reference value and the coordinate value between the two control points notified from the readout units 10x through 10z and store the travels as pre-correction travels 21x through 21z in the travel holding unit 12. In the numerical controller of the invention, calculation of the pre-correction travels by the distribution processing units is carried out in parallel for all the table format data in execution. In the example of FIG. 1, the calculation of the pre-correction travels 21x through 21z is carried out in parallel by the distribution processing units 11x through 11z for the table format data 20x through 20z.

The pre-correction travels 21x through 21z for the axes stored in the travel holding unit 12 are read out by the overlap control unit 13 and a synthesized velocity per unit reference value is calculated therefrom. When the synthesized velocity is lower than a threshold $V_t$ of the synthesized velocity specified in advance for start of the overlapping, the overlap control unit 13 presumes entrance into an overlap period and reads the travel holding unit 12 on until the synthesized velocity subsequently exceeds the threshold $V_t$. Then a lower limit velocity $V_0$ the synthesized velocity brought about by the pre-correction travels 21x through 21z reaches and a reference value $L_0$ at that point are stored.

Once the travel holding unit 12 has been read on until the synthesized velocity subsequently exceeds the threshold $V_t$, the overlap control unit 13 presumes that the overlap period has ended and prepares post-correction travels 22x through 22z based on the pre-correction travels 21x through 21z for the overlap period read out from the travel holding unit 12. Specifically, a reference value at which travels of the axes after the reference value $L_0$ are outputted is advanced and the travels superposed on the travels of the axes before the reference value $L_0$ are stored as the post-correction travels 22x through 22z in the travel holding unit 12. Then the reference value at which the travels after the reference value $L_0$ are outputted is advanced within a range in which the synthesized velocity brought about by the post-correction travels 22x through 22z does not exceed the threshold $V_t$. The motors achieve the overlapping by operating based on the post-correction travels 22x through 22z.

Figure 2:
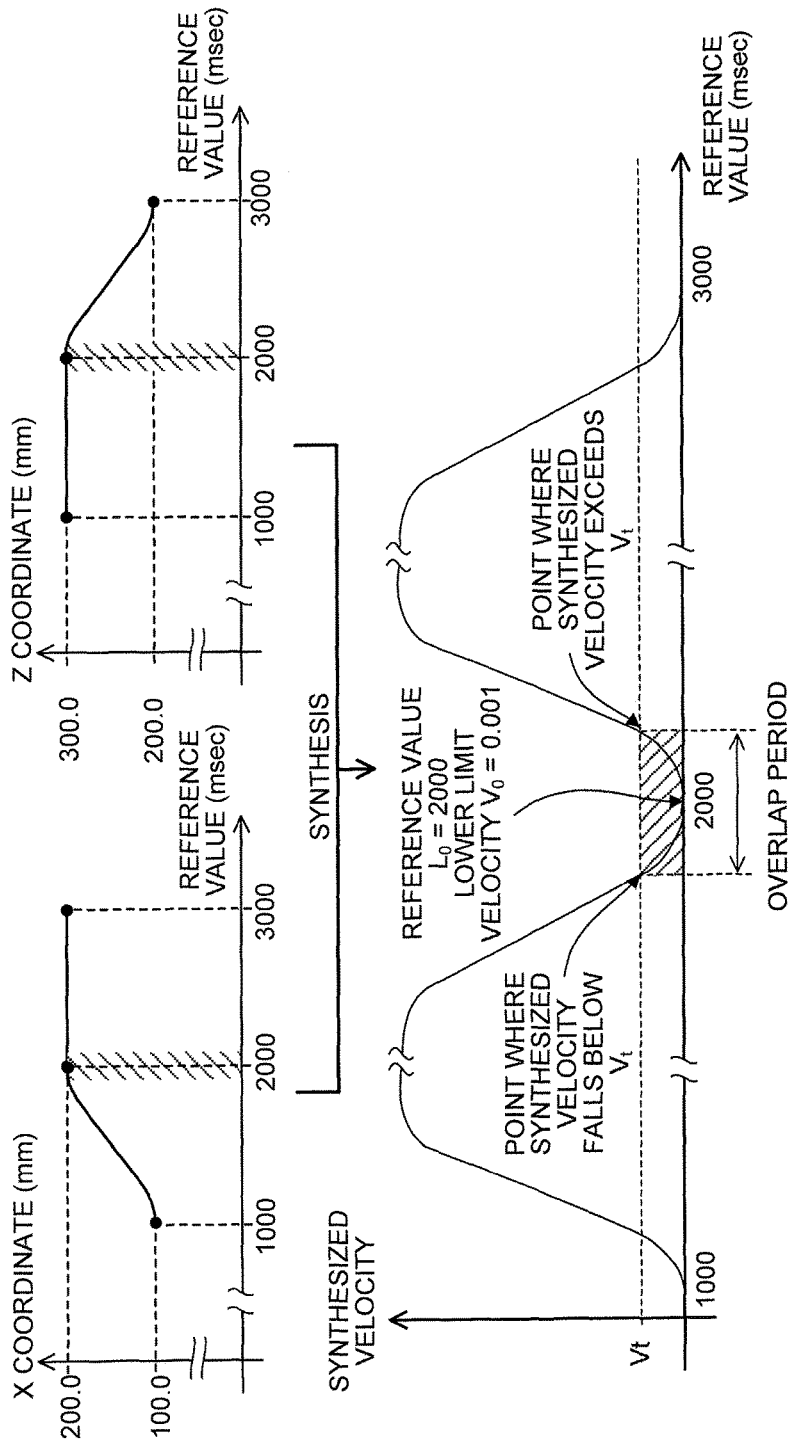
FIG. 2 is an example of calculation of a synthesized velocity by the numerical controller according to the embodiment of the invention.

FIG. 2 illustrates an example in which the synthesized velocity for the X axis and the Z axis is calculated when the X axis is controlled based on the table format data <TIME_TABLE_0101_X> and when the Z axis is controlled based on the table format data <TIME_TABLE_0101_Z>. On condition that $V_t$ is 0.010 mm/msec in FIG. 2, a shaded part in FIG. 2 defines the overlap period.

FIG. 3 is a table illustrating changes in the velocities of the axes and a change in the synthesized velocity around the overlap period in FIG. 2. In FIG. 3, the synthesized velocity for the X axis and the Z axis has the lowest value when the reference value L=1999, 2000 and thus the lower limit velocity $V_0$=0.001 at the reference value $L_0$=1999 and $L_0$=2000 is stored.

Figure 4:
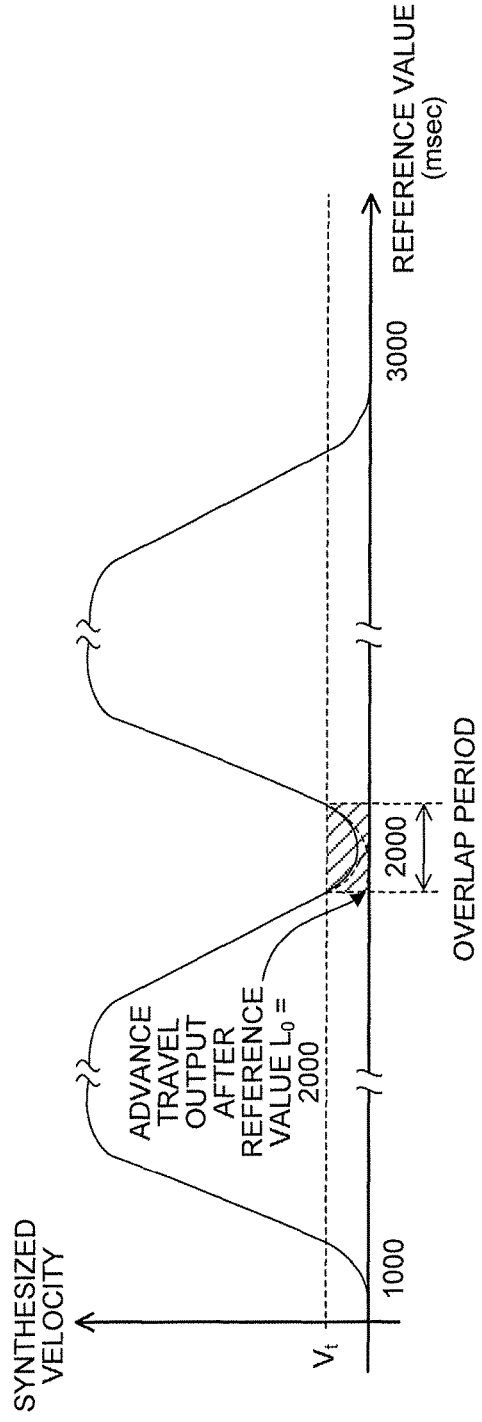
FIG. 4 is a diagram illustrating the synthesized velocity resulting from post-correction travels in the numerical controller according to the embodiment of the invention.
Figure 5:
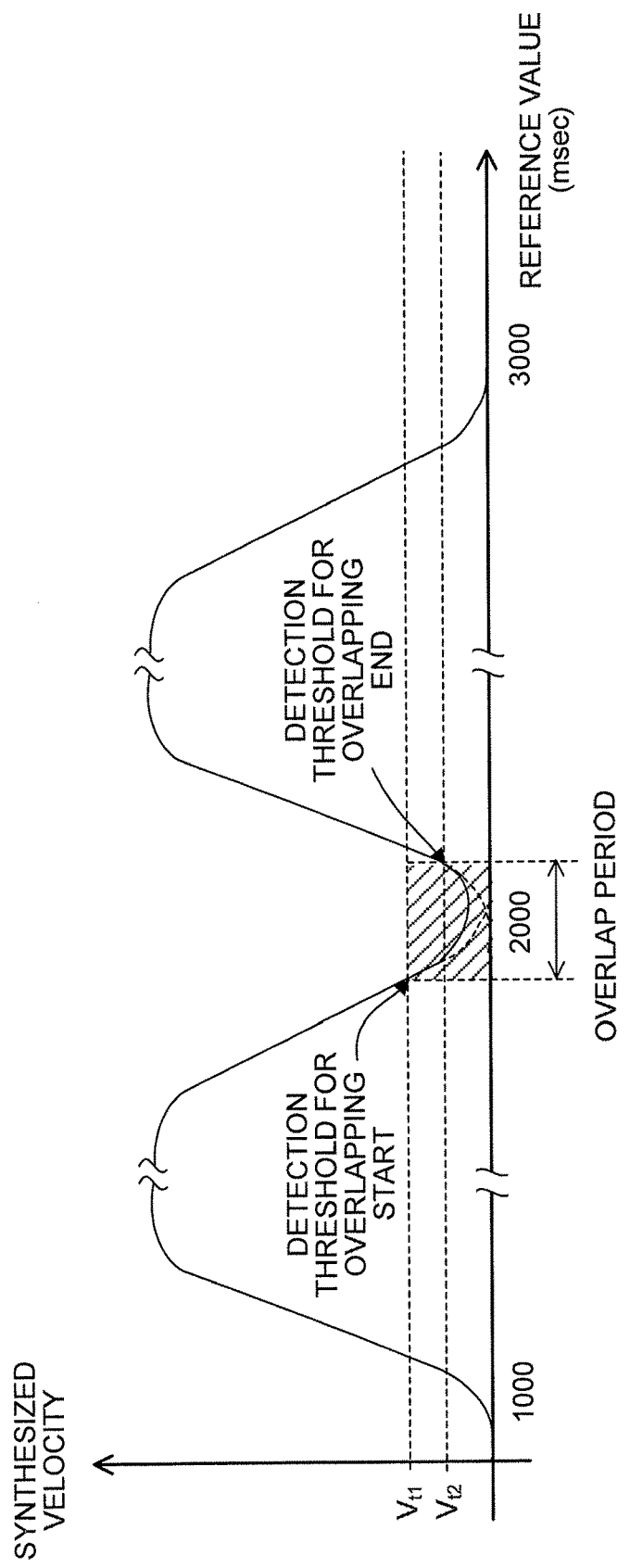
FIG. 5 is a diagram illustrating a modification in which a threshold for start of overlapping and a threshold for end of the overlapping are made different.

FIG. 4 illustrates, by a graph and a table, the synthesized velocity brought about by the post-correction travels in which the X axis and Z axis travels after the reference value $L_0$=2000 when the lower limit velocity $V_0$ of the synthesized velocity brought about by the pre-correction travels illustrated in FIG. 3 is outputted last are advanced in the reference value and superposed on the X axis and Z axis travels before the reference value $L_0$. The threshold $V_t$ of the synthesized velocity for the start of the overlapping may be set as a default value by parameters and may dynamically be varied by insertion of specialized commands in the table format data. As illustrated in FIG. 5, a threshold $V_{t1}$ of the synthesized velocity for the start of the overlapping and a threshold $V_{t2}$ of the synthesized velocity for end of the overlapping may be set at different values.

Figure 6:
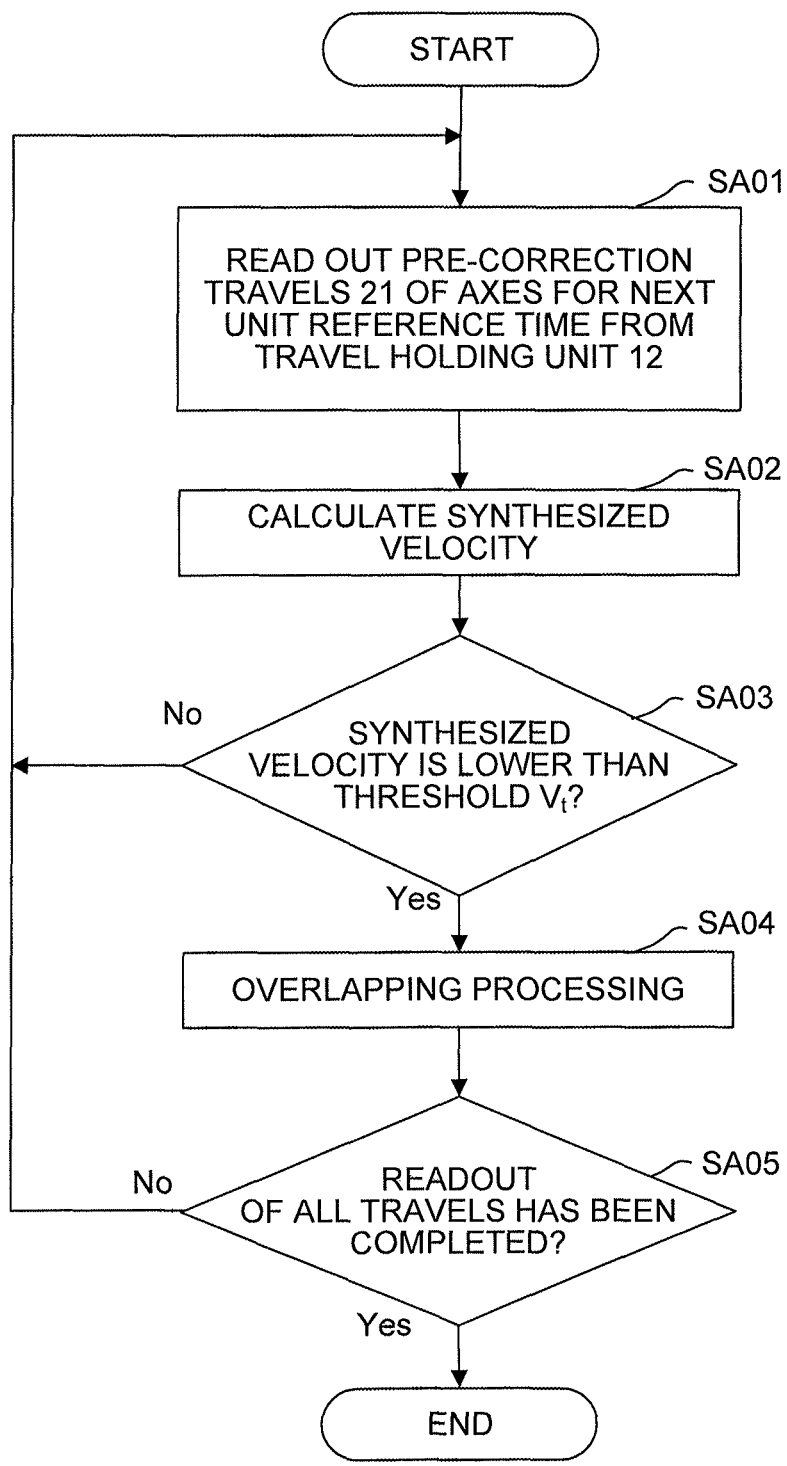
FIG. 6 is a flow chart in which operation of an overlap control unit is described.

FIG. 6 is a flow chart in which operation of the overlap control unit 13 according to the embodiment is described.

[Step SA01] The overlap control unit 13 sequentially reads out the pre-correction travels 21 for every unit reference value in all the table format data 20, the pre-correction travels 21 being calculated by the distribution processing units 11, from the travel holding unit 12.

[Step SA02] The overlap control unit 13 synthesizes the pre-correction travels 21 for every unit reference value in all the table format data 20 read out in step SA01 and thus calculates the synthesized velocity.

[Step SA03] The overlap control unit 13 determines whether the synthesized velocity calculated in step SA02 is lower than the threshold $V_t$ of the synthesized velocity set in advance for the start of the overlapping. The flow proceeds to step SA04, if the synthesized velocity is lower than the threshold $V_t$, or the flow returns to step SA01, if the synthesized velocity is not lower than the threshold $V_t$.

[Step SA04] The overlap control unit 13 carries out the overlapping processing for the table format data 20. Details of step SA04 will be described later.

[Step SA05] The overlap control unit 13 determines whether readout of all the travels in the travel holding unit 12 has been completed. The operation is ended if the readout has been completed, or the flow returns to step SA01, if the readout has not been completed.

Figure 7:
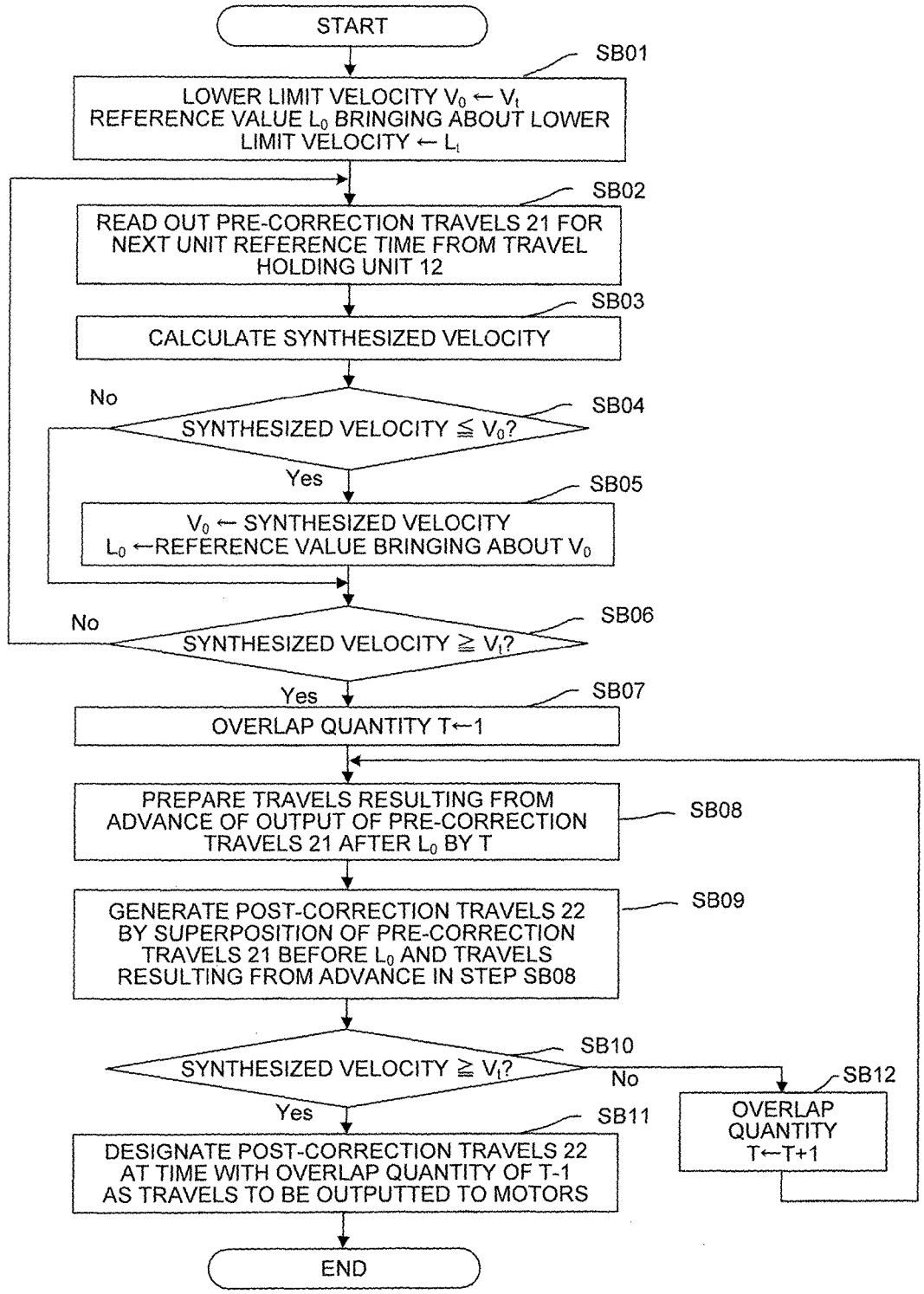
FIG. 7 is a flow chart in which details of operation of overlapping processing are described.

FIG. 7 is a flow chart illustrating the details of the overlapping processing of step SA04 in the flow chart of FIG. 6.

[Step SB01] The overlap control unit 13 substitutes the velocity $V_t$ and a reference value $L_t$ at the start of the overlapping processing as initial values of the lower limit velocity $V_0$ and the reference value $L_0$ that brings about the lower limit velocity.

[Step SB02] The overlap control unit 13 reads out the pre-correction travels 21 for the next unit reference value in all the table format data from the travel holding unit 12.

[Step SB03] The overlap control unit 13 calculates the synthesized velocity for the axes based on the pre-correction travels 21 read out in step SB02.

[Step SB04] The overlap control unit 13 determines whether the synthesized velocity calculated in step SB03 is equal to or lower than the lower limit velocity $V_0$. The flow proceeds to step SB05, if the synthesized velocity is equal to or lower than the lower limit velocity $V_0$, or the flow proceeds to step SB06, if the synthesized velocity is higher than the lower limit velocity $V_0$.

[Step SB05] The overlap control unit 13 substitutes the synthesized velocity calculated in step SB03 and the reference value at that point for the lower limit velocity $V_0$ and the reference value $L_0$ that brings about the lower limit velocity.

[Step SB06] The overlap control unit 13 determines whether the synthesized velocity calculated in step SB03 is equal to or higher than the threshold $V_t$ for the end of the overlapping. If the synthesized velocity is equal to or higher than the threshold $V_t$, it is presumed that the overlap period has ended and the flow proceeds to step SB07. If the synthesized velocity is lower than the threshold $V_t$, it is determined that the overlap period is continuing and the flow returns to step SB02.

[Step SB07] The overlap control unit 13 initializes an overlap quantity T (unit reference value) to 1.

[Step SB08] The overlap control unit 13 prepares the travels resulting from advance of the output by the unit reference value T relative to the pre-correction travels 21 for all the table format data 20 after the reference value $L_0$ that brings about the lower limit velocity.

[Step SB09] The overlap control unit 13 temporarily stores, in the travel holding unit 12, the travels prepared in step SB08 and superposed on the pre-correction travels 21 before the reference value $L_0$ that brings about the lower limit velocity, as the (tentative) post-correction travels 22.

[Step SB10] The overlap control unit 13 determines whether the synthesized velocity in the overlap period based on the post-correction travels 22 calculated in step SB09 exceeds the threshold $V_t$. The flow proceeds to step SB11, if the synthesized velocity exceeds the threshold $V_t$, or the flow proceeds to step SB12, if the synthesized velocity does not exceed the threshold $V_t$.

[Step SB11] The overlap control unit 13 designates the post-correction travels 22 at the time when the overlap quantity is T−1, among the (tentative) post-correction travels 22 stored in the travel holding unit 12, as the formal post-correction travels 22. Providing that T=1 holds then, the pre-correction travels 21 are used without modification as the post-correction travels 22.

[Step SB12] The value of the overlap quantity T is incremented by one and the flow returns to step SB08.

When the operation based on the table format data 20 and read-ahead cannot be performed in parallel for reasons such as restrictions as to hardware or when it is desirable that sites for the overlapping should be checked before the operation, direct rewriting of the table format data 20 may be performed by the overlap control unit 13, instead of output of the post-correction travels 22.

Figure 8:
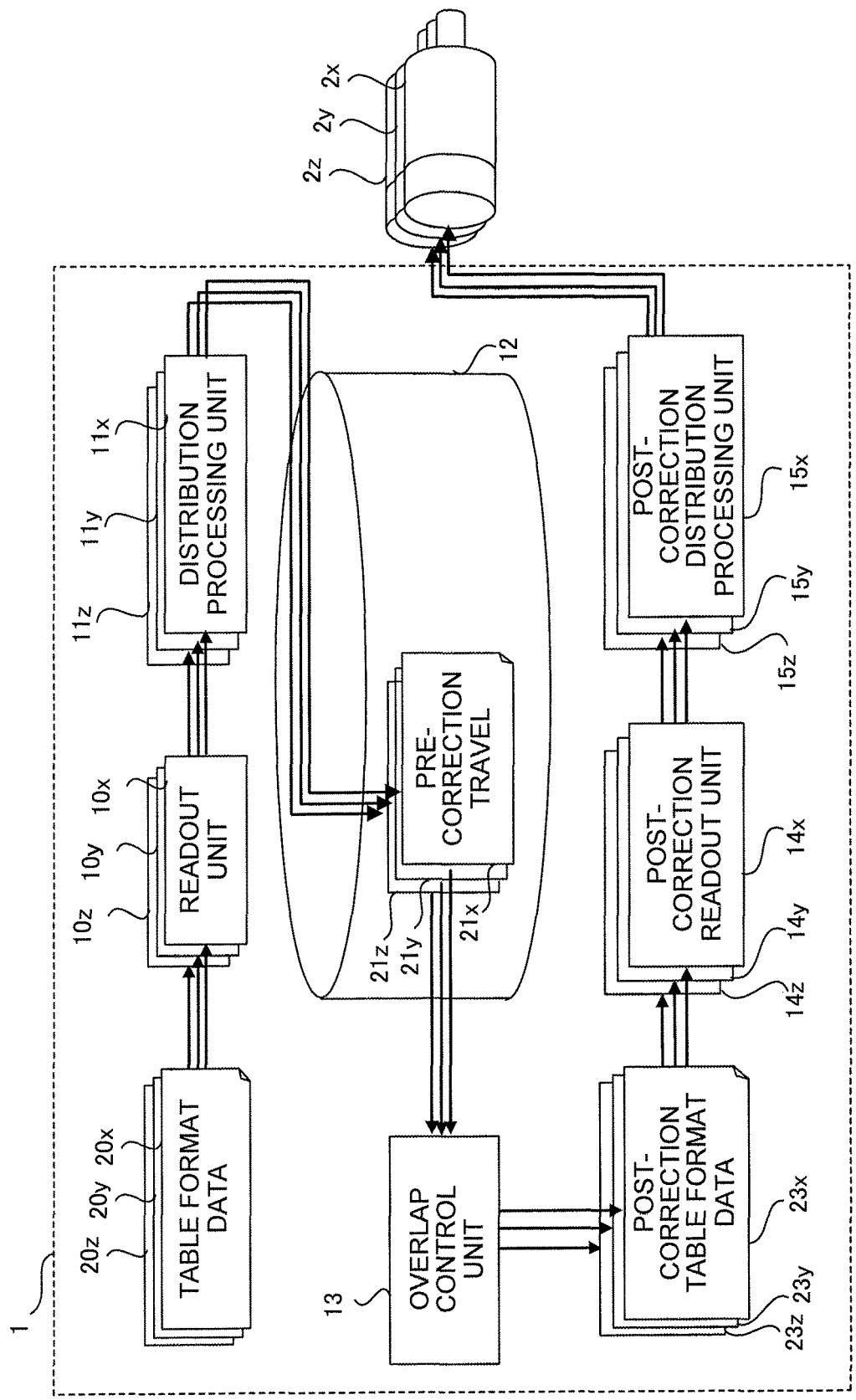
FIG. 8 is a block diagram illustrating a configuration of a numerical controller according to another embodiment of the invention.

FIG. 8 is a block diagram on a numerical controller according to another embodiment of the invention in which the overlap control unit directly rewrites the table format data. In the numerical controller 1 according to the embodiment, the table format data 20 is read in based on commands from the overlap control unit 13 and the overlapping processing based on the pre-correction travels 21 is carried out before the operation based on the table format data is performed. The overlapping processing the overlap control unit 13 according to the embodiment carries out differs from the flow chart illustrated in FIG. 7 in that post-correction table format data 23 in which commands indicating the overlap quantity are added to the table format data 20 is prepared after calculation of the overlap quantity instead of preparation of the post-correction travels 22, in that post-correction readout units 14 sequentially read out the post-correction table format data 23 based on the reference value and pass the post-correction table format data 23 to post-correction distribution processing units 15, and in that control axes are controlled based on post-correction travels generated by the post-correction distribution processing units 15. Then the post-correction table format data 23 may be prepared with overwriting of the table format data 20 or may be prepared as new table format data.

Figure 9:
FIG. 9 is a diagram illustrating an example of post-correction table format data in the numerical controller according to another embodiment of the invention.

FIG. 9 illustrates an example of the post-correction table format data having undergone correction by the overlap control unit 13 according to the embodiment. Overlap commands "OVL4" added to the post-correction table format data illustrated in FIG. 9 each signify that a travel just after the command should be made to overlap with a travel just before the command by the reference value of 4.

Figure 10:
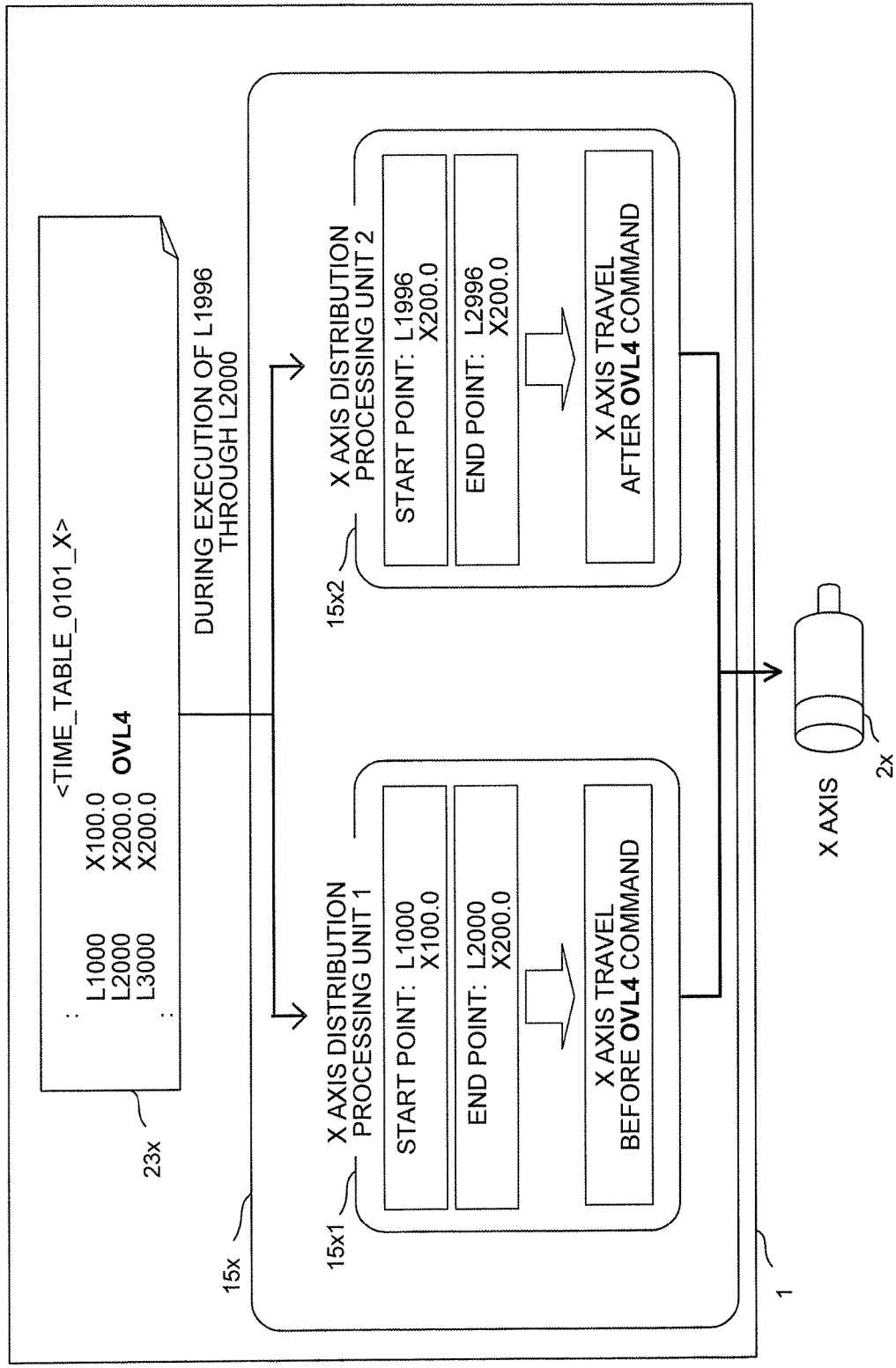
FIG. 10 is a diagram illustrating an example in which overlapping processing of the post-correction table format data is carried out by two post-correction distribution processing units in the numerical controller according to another embodiment of the invention.
Figure 11:
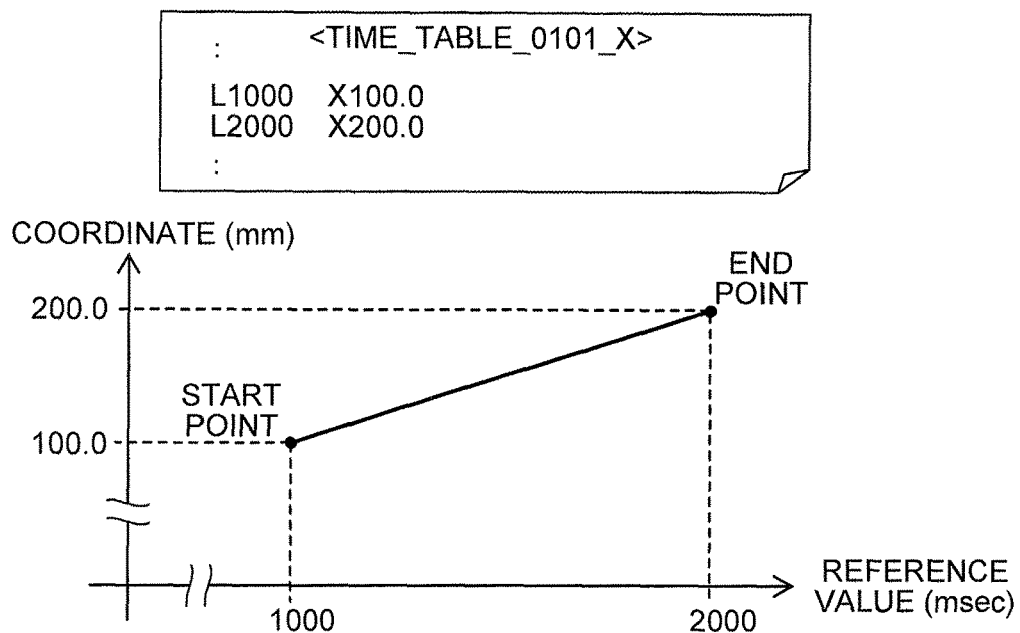
FIG. 11 is a diagram (1) illustrating operation control over a control axis based on common table format data.
Figure 12:
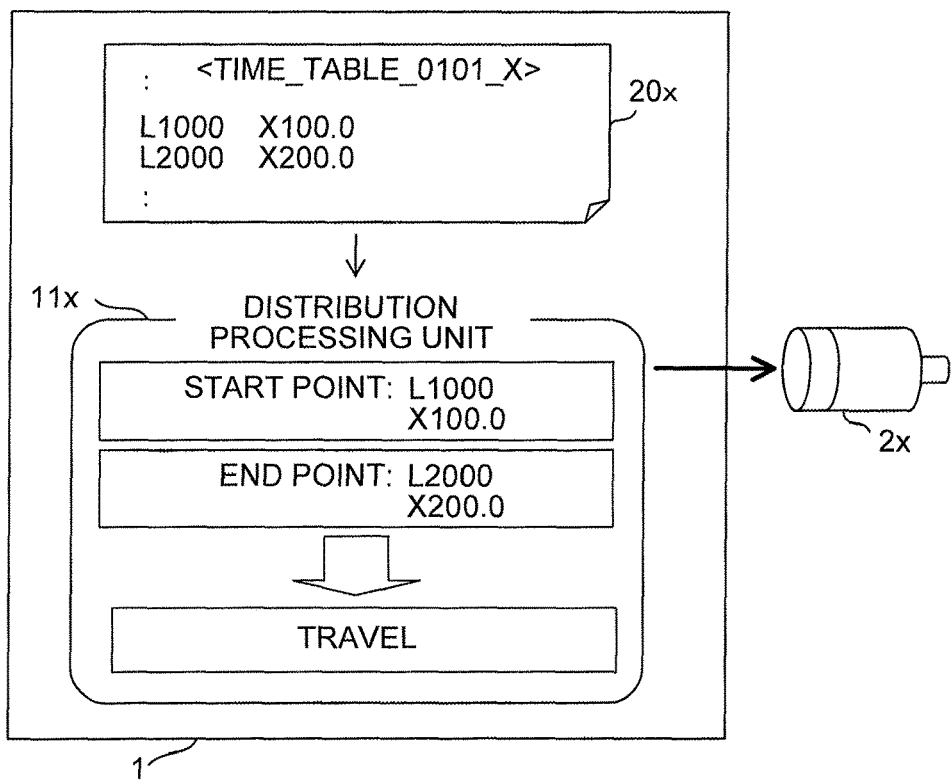
FIG. 12 is a diagram (2) illustrating the operation control over the control axis based on the common table format data.
Figure 13:
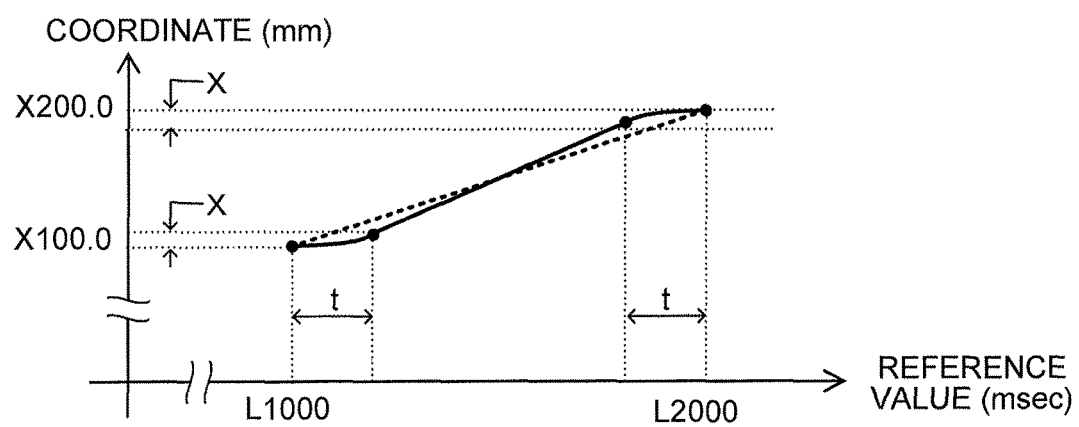
FIG. 13 is a diagram illustrating table format data in an example in which acceleration/deceleration control is carried out.
Figure 14:
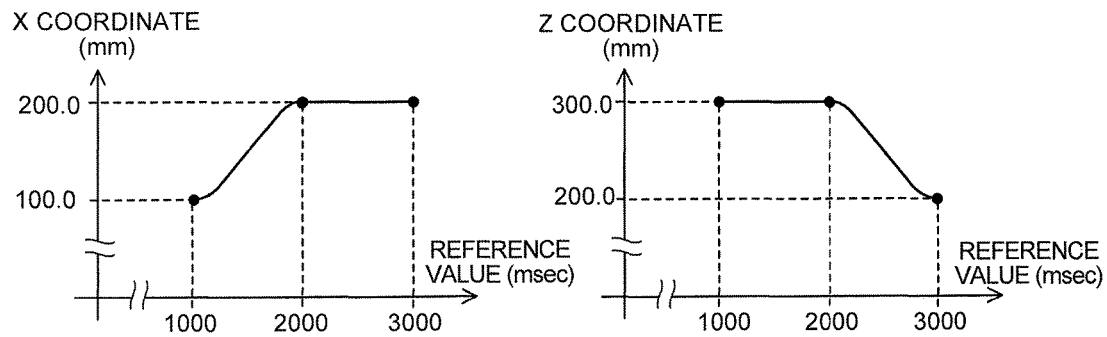
FIG. 14 is a diagram (1) illustrating an example in which two axes are controlled with use of table format data.
Figure 14:
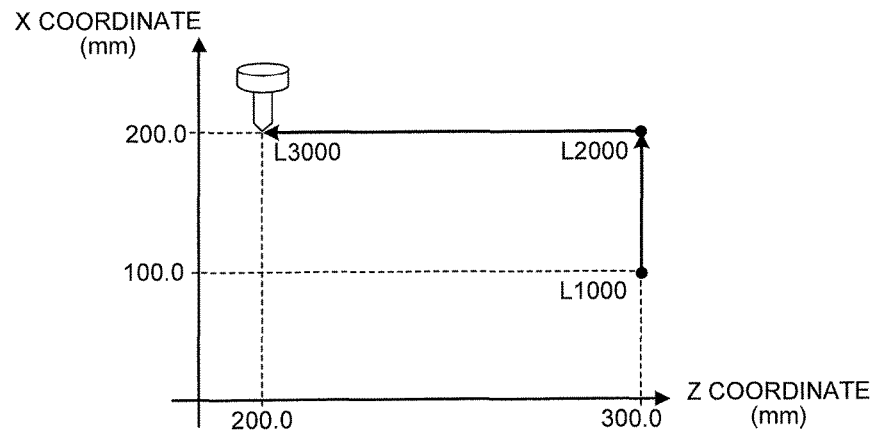
Figure 15:
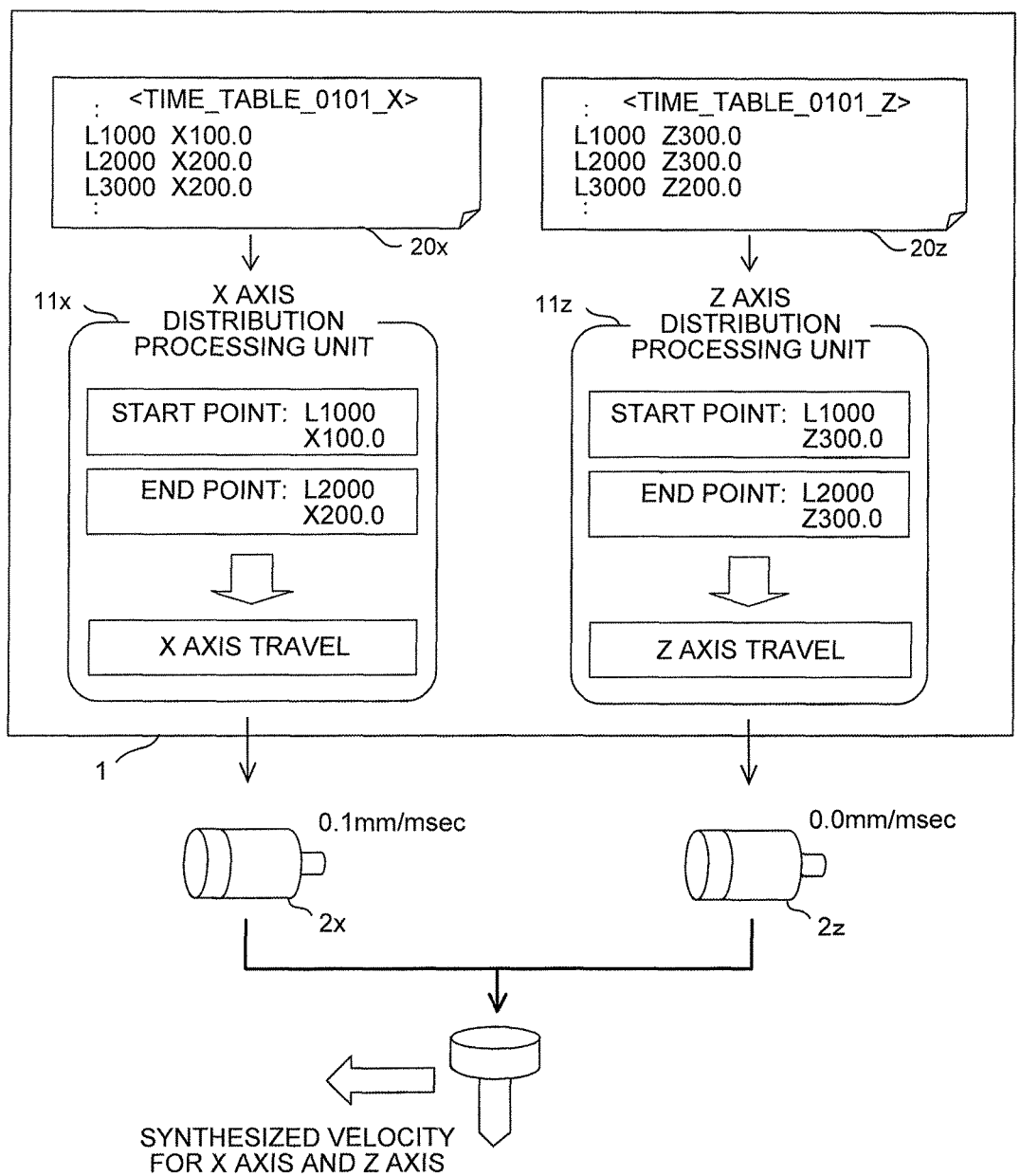
FIG. 15 is a diagram (2) illustrating the example in which the two axes are controlled with use of the table format data.
Figure 16:
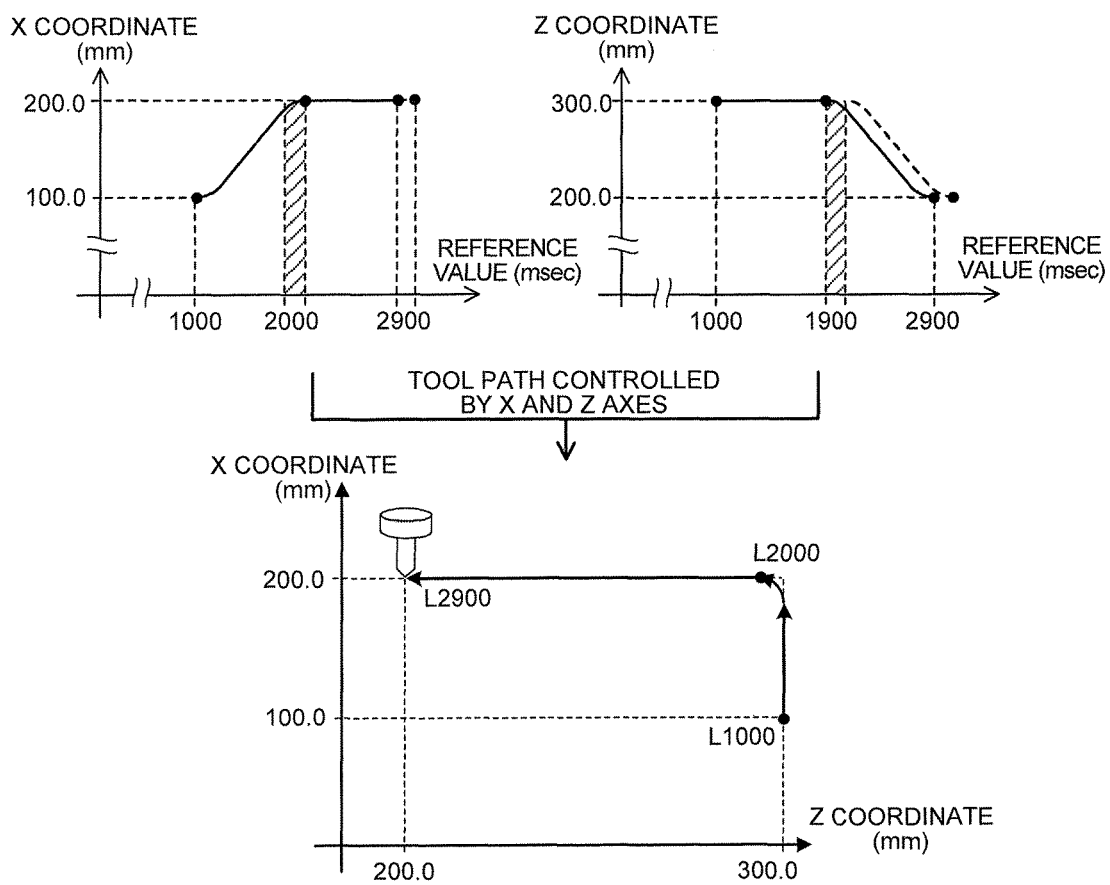
FIG. 16 is a diagram illustrating an example in which the two axes are controlled with overlapping with use of the table format data.

The numerical controller 1 according to the embodiment can be implemented by provision of a post-correction distribution processing unit that outputs the travel before an overlap command and a post-correction distribution processing unit that outputs the travel after the overlap command, for each of the post-correction table format data 23, in each post-correction distribution processing unit 15 that operates the post-correction table format data 23 having undergone the correction by the overlap control unit 13, as an example. In the overlap period (reference value L1996 to 2000) in case where the X axis control is carried out based on the post-correction table format data 23x for use in the X axis control as illustrated in FIG. 10, for instance, two distribution processing units, that is, a distribution processing unit 15x1 that outputs the travel before an overlap command based on a command normally given by the post-correction table format data 23x and a distribution processing unit 15x2 that outputs the travel after the overlap command with the reference value advanced by a value specified by the OVL command simultaneously operate in the post-correction distribution processing unit 15x and the two travels thereby calculated are superposed and outputted to the motor 2x.

After L2000 in the above example, the distribution processing unit 15x1 for the X axis is disabled and commands are processed by the distribution processing unit 15x2 for the X axis. Therefore, the command "OVL4" and later are executed at timing advanced by 4 units of the reference value. The above processing is for the X axis and, for the other axes, the travels before and after "OVL4" are similarly superposed and outputted to the motors.

In the numerical controller 1 according to the embodiment, the travel holding unit 12 and the overlap control unit 13 do not have to be used in the operation based on the post-correction table format data.

Though the embodiments of the invention have been described above, the invention is not limited to the examples of the embodiments described above and can be embodied in various manners with appropriate modification.

The invention claimed is:

1. A numerical controller to set time, an axis position, or a spindle position as a reference value, to use a plurality of table format data specifying positions of control axes, and to control the positions of the plurality of control axes in synchronization with the reference value, the numerical controller comprising:
readout units that sequentially read out the table format data in synchronization with the reference value;
distribution processing units that generate travels of the control axes based on command blocks read out by the readout units;
a travel holding unit that temporarily stores the travels of the control axes generated by the distribution processing units; and
an overlap control unit that reads out the travels of the control axes from the travel holding unit, finds an overlap quantity as an amount in the reference value of overlapping of the travels of the control axes, and writes post-correction travels resulting from the overlapping of the travels of the control axes by the overlap quantity into the travel holding unit,
wherein the control axes are controlled based on the post-correction travels.

2. The numerical controller according to claim 1, wherein the overlap control unit reads out the travels of the plurality of control axes in synchronization with the reference value and thereby calculates a synthesized velocity.

3. The numerical controller according to claim 2, wherein the overlap control unit detects the reference value minimizing the synthesized velocity in an overlap period in which the synthesized velocity is equal to or lower than a threshold specified in advance, finds the overlap quantity as the amount in the reference value of overlapping of the travels of the control axes after the detected reference value with the travels of the control axes before the detected reference value, advances the travels of the control axes after the reference value minimizing the synthesized velocity by the overlap quantity, and calculates the post-correction travels resulting from superposition of the travels of the control axes after the reference value on the travels of the control axes before the reference value minimizing the synthesized velocity.

4. The numerical controller according to claim 3, wherein the overlap control unit finds the overlap quantity within a range in which the post-correction travels are equal to or lower than the threshold in the overlap period.

5. The numerical controller according to claim 3, wherein the overlap control unit is capable of changing the threshold by commands based on the table format data, parameters, or signals.

6. A numerical controller to set time, an axis position, or a spindle position as a reference value, to use a plurality of table format data specifying positions of control axes, and to control the positions of the plurality of control axes in synchronization with the reference value, the numerical controller comprising:
readout units that sequentially read out the table format data in synchronization with the reference value;
distribution processing units that generate travels of the control axes based on command blocks read out by the readout units;
a travel holding unit that temporarily stores the travels of the control axes generated by the distribution processing units;
an overlap control unit that reads out the travels of the control axes from the travel holding unit, finds an overlap quantity as an amount in the reference value of overlapping of the travels of the control axes, and outputs post-correction table format data in which overlap commands to carry out the overlapping by the overlap quantity are added to the table format data;

post-correction readout units that sequentially read out the post-correction table format data in synchronization with the reference value; and post-correction distribution processing units that generate post-correction travels of the control axes based on command blocks read out by the post-correction readout units, wherein the control axes are controlled based on the post-correction travels generated by the post-correction distribution processing units.

7. The numerical controller according to claim 6, wherein the overlap control unit reads out the travels of the plurality of control axes in synchronization with the reference value and thereby calculates a synthesized velocity.

8. The numerical controller according to claim 7, wherein the overlap control unit detects the reference value minimizing the synthesized velocity in an overlap period in which the synthesized velocity is equal to or lower than a threshold specified in advance, finds the overlap quantity as the amount in the reference value of overlapping of the travels of the control axes after the detected reference value with the travels of the control axes before the detected reference value, and outputs the post-correction table format data in which the overlap commands are added to the reference value minimizing the synthesized velocity.

9. The numerical controller according to claim 8, wherein the overlap control unit finds the overlap quantity within a range in which the post-correction travels are equal to or lower than the threshold.

10. The numerical controller according to claim 8, wherein the overlap control unit is capable of changing the threshold by commands based on the table format data, parameters, or signals.

11. The numerical controller according to claim 6, wherein, upon input of the overlap commands, the post-correction readout units simultaneously read out table format data commands before the overlap commands and table format data commands after the overlap commands and output the table format data commands to the post-correction distribution processing units.

12. The numerical controller according to claim 6, wherein the post-correction distribution processing units calculate the post-correction travels resulting from superposition of pre-overlapping travels that are travels of the control axes calculated from the table format data commands before the overlap commands and post-overlapping travels that are travels of the control axes calculated from the table format data commands after the overlap commands.

* * * * *